United States Patent

[11] 3,563,159

| [72] | Inventor | Martha Johnson<br>1666 Eleventh Ave., Huntington, W. Va. 25701 |
|---|---|---|
| [21] | Appl. No. | 790,947 |
| [22] | Filed | Jan. 14, 1969 |
| [45] | Patented | Feb. 16, 1971 |

[54] ROTISSERIE
3 Claims, 3 Drawing Figs.

[52] U.S. Cl. ................................................ 99/339,
99/386, 99/393, 99/421, 99/427
[51] Int. Cl. ........................................................ A47j 37/04
[50] Field of Search ......................................... 99/421,
386, 421(H), 421(P), 421(V), 427, 443, 393

[56] References Cited
UNITED STATES PATENTS
1,541,472  6/1925  Born ............................ 99/421(H)X
1,781,669  11/1930  Petersen ....................... 99/427X
2,705,450  4/1955  Steinbook ..................... 99/421(H)X
2,938,450  5/1960  Carpenter et al. ............ 99/421(H)X
2,940,380  6/1960  Rampel ........................ 99/421(H)X
3,220,336  11/1965  Hoover ......................... 99/443X

*Primary Examiner*—Walter A. Scheel
*Assistant Examiner*—Arthur O. Henderson
*Attorney*—Sherman Levy ABSTRACT: A rotisserie or cooking appliance that includes a rotary drum that has openings therein, a shell or housing surrounding the drum and provided with a plurality of sections that are provided with members for holding food products thereon that are to be barbecued or cooked and a novel means for applying heat to the food products.

INVENTOR,
Martha Johnson
BY

ATTORNEY

3,563,159

ROTISSERIE

BACKGROUND OF THE INVENTION

1. Field of the Invention

The present invention pertains the field of Foods and Beverages as defined in Class 99, subclasses 419, 420 and 421.

2. Description of the Prior Art

The prior art includes the following prior patents; Re. 23,662; 1,786,300; 2,705,450; 2,938,450, and 3,194,148.

The rotisserie of the present invention has an open mesh cylinder and wherein the meat or other food products are held in place adjacent the cylinder or drum, there being a means provided for conveniently gaining access to the food products being cooked as well as to the inside of the drum and wherein a spit is adapted to be provided on the inside of the drum for holding roasts and the like which are to be barbecued or cooked.

SUMMARY OF THE INVENTION

In accordance with the present invention, there is provided a rotisserie that includes a drum or cylinder that is rotated at the proper speed by a motor, the drum having a plurality of apertures or openings therein so that the heat process can take place in the proper manner, there being provided a plurality of hingedly mounted sections arranged adjacent the outer periphery of the drum whereby food products can be conveniently held in place adjacent the outer surface of the drum and wherein a spit is provided for holding food products within the drum so that such food products can be cooked or barbecued in the desired manner and wherein a suitable heat source is provided for accomplishing the desired cooking action.

DESCRIPTION OF THE PREFERRED EMBODIMENTS

Figure 2:
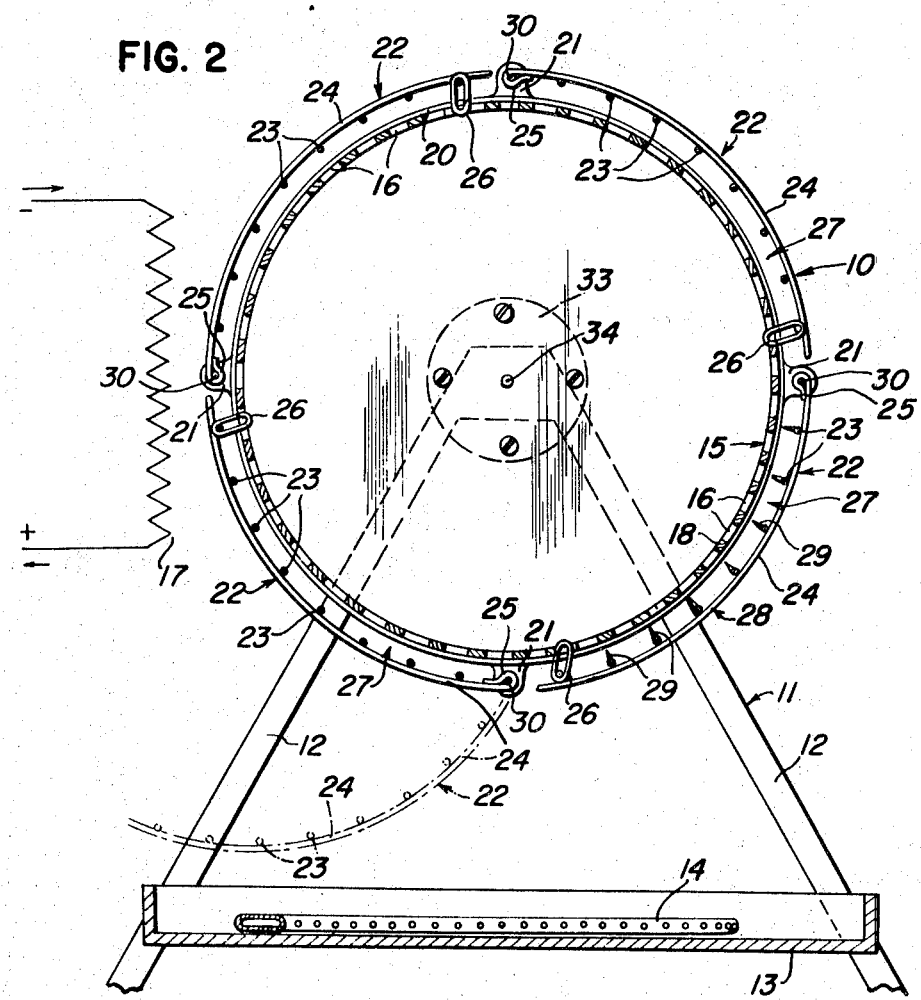
FIG. 2 is a sectional view taken on the line 2–2 of FIG. 1.

Attention is directed to the drawings, wherein the numeral 10 indicates the rotisserie of the present invention that includes spaced apart vertically disposed frame members 11 which each may include legs 12, FIG. 2. A horizontally disposed tray 13 is adapted to be supported between the frame members 11, and the tray 13 may have a suitable heat means or mechanism 14 therein which may be of the gas operated type.

As shown in the drawings, the numeral 15 indicates a cylinder or rotary drum that includes a cylindrical body member 18 that may be of a mesh construction so that it includes a plurality of apertures or openings 16 therein. If desired, other types of heating means can be used in place of the gas jet mechanism 14, and, for example, charcoal, wood or the like can be positioned in the tray 13 or else an electrical heat unit 17 can be provided for the rotisserie. Arranged contiguous to the ends of the rotary drum 15 and affixed thereto are spaced parallel circular bands 20. Vertically disposed spaced circular plates 19 are arranged contiguous to the bands 20, and a body member 18 is formed integral with the drum 15. The plates 19 each are provided with a plurality of spaced apart lugs 21.

There is further provided a plurality of generally similar support sections 22 which each include spaced parallel rods 23 that have affixed thereto arcuate straps 24, and the straps 24 are affixed to end portions of the rods 23, and end portions 25 of the straps 24 are hingedly connected to pins or securing elements 30 on the lugs 21. There is also provided retainers or keepers 26 for selectively maintaining or holding the support sections 22 in their closed position relative to the drum 15. When the support sections 22 are in their closed or operative position there is provided or defined a space 27 between the support sections and the drum, and the space 27 is adapted to be used for holding food products that are to be heated or cooked or barbecued. The support sections 22, when in closed position, define a generally cylindrical housing or casing 28 that is slightly larger in diameter than the drum 15. The rods 23 of one of the support sections 22 are provided with a plurality of prongs or pointed elements 29 which may be used for holding thereon small pieces of meat, fowl or the like whereby such small pieces of food products can be conveniently impaled thereon to hold these products in their proper position.

Figure 1:
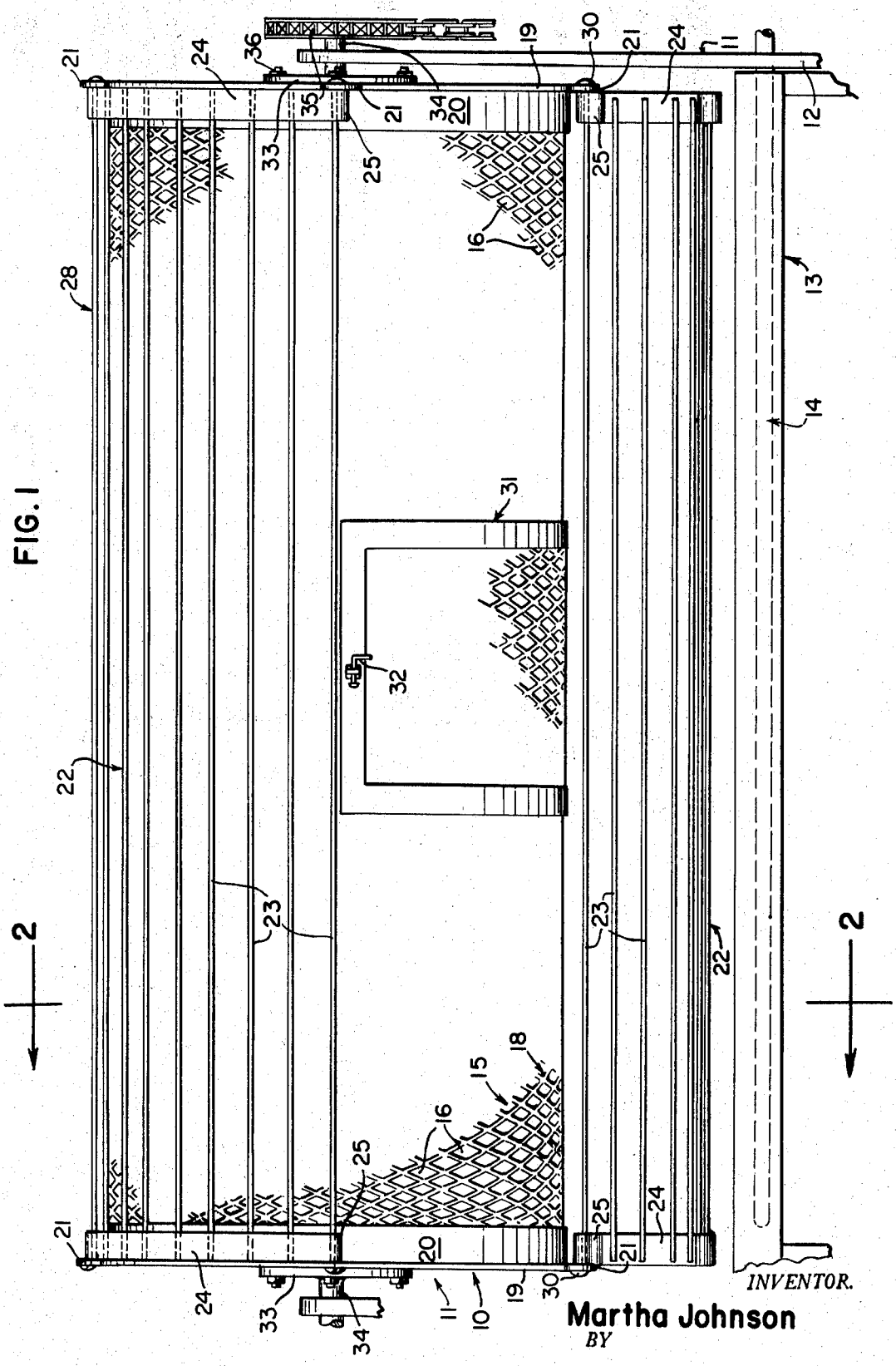
FIG. 1 is a front elevational view of the rotisserie of the present invention and showing one of the food holding sections open, and with parts broken away.

As shown in FIG. 1, a door or gate 31 is provided in the intermediate portion of the drum 15, and the door 31 is adapted to be hingedly connected to the adjacent portions of the drum in any suitable manner. A retainer or latch 32 is provided for selectively maintaining the door 31 in its closed position.

The rotisserie of the present invention further includes a means for rotating the drum 15 and/or simultaneously rotating the housing 28. This means comprises vertically disposed discs 33 that may be suitably secured to the plates 19 as at 36 and discs 33 have shafts 34 suitably connected thereto. The shafts 34 may be rotatably supported in the upper portions of the frame member 11. A chain and sprocket mechanism 35 is adapted to be connected to one or both of the shafts 34, and the chain and sprocket mechanism 35 is adapted to be actuated by a suitable motor of conventional construction.

Figure 3:
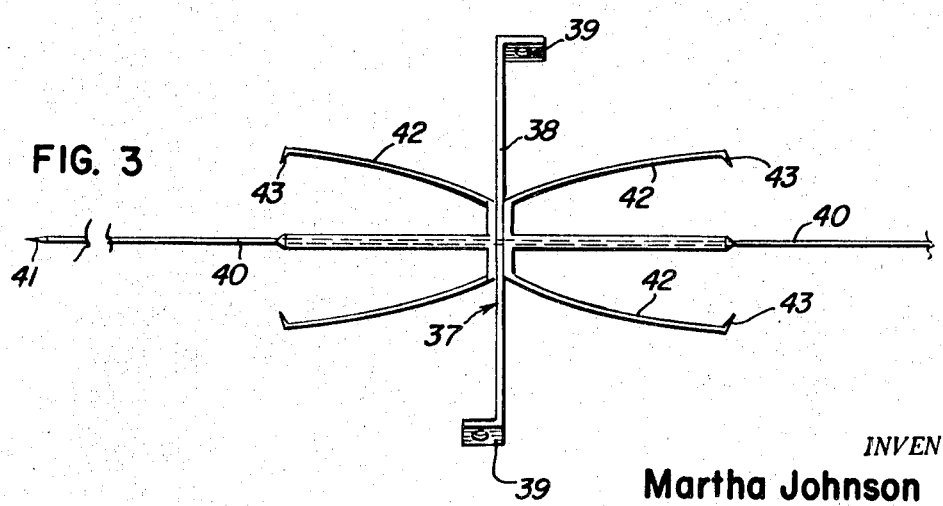
FIG. 3 is an elevational view of the spit.

Referring to FIG. 3 of the drawings, there is illustrated a spit which is adapted to be mounted in the drum 15. The spit is indicated by the numeral 37 and includes a crosspiece 38 that has transversely disposed apertured lugs 39 on the outer ends thereof whereby suitable means such as a nut and bolt assembly can be used for fastening the lugs 39 to intermediate portions of the drum 15. The spit 37 may also include arms 40 having pointed ends 41 for conveniently receiving thereon roasts or other food products. In addition, the spit 37 includes integral support elements 42 having barbs or pointed prongs 43 for conveniently holding the roasts or other products to be cooked or barbecued.

From the foregoing, it will be seen that there has been provided a rotisserie, and in use with the parts arranged as shown in the drawings the door 31 may be opened by releasing the latch 32, and with the previously described spit mounted in the intermediate portion of the drum 15, roasts, steaks, fowl or the like can be conveniently supported on the spit 37 as, for example, by impaling such food products on the pointed ends 41 or by having such products engaged by the pointed barbs 43. Because the spit 37 is adapted to be secured to the drum 15 by means of securing elements that extend through the aperture lugs 39, it will be seen that as the drum 15 rotates the spit 37 will rotate simultaneously therewith. After the food desired to be cooked or barbecued is placed on the spit 37 the door 31 is again closed and the latch 32 is moved to locked position to hold the door 31 in its closed position.

In addition, by releasing one or more of the retainers 26 the support sections 22 swing open about an axis extending through pivot pins 30 so that, for example, any of the support sections of the solid line position of FIG. 2 can be brought to the broken line position of FIG. 3 whereby small pieces of food product such as small pieces of meat or fowl can be placed between the space 27 and the housing 28 and the drum 15. Also, when desired certain of these food products can be impaled or fastened on the barbs or pointed prongs 43 to prevent accidental dropping of the food products. Then after these articles are placed in the space 27 the support sections 22 are returned to their closed position as shown in solid lines, FIG. 2, and the retainers for maintaining the support sections in closed position surrounding the drum 15.

It is to be noted that the drum 15 includes the body member 18 that may be made of a meshlike material so that it has a plurality of apertures or openings 16 therein. Also, the support sections 22 consist of spaced parallel rods 23, and there is provided between the rods 23 spaces for the passage therethrough of heat, smoke and the like. Thus, by supplying heat from a suitable gas jet or from charcoal or wood that may be arranged in the tray 13 or by supplying heat from an electrical unit 17, the food products can be cooked or barbecued in a highly efficient manner so that the heat can be able to travel efficiently throughout the entire rotisserie to cook the food products uniformly and evenly throughout their entire surface.

The drum 15 and housing 18 are adapted to be rotated at a desired rate of speed to assure proper cooking of the food products, and this rotation may be accomplished by means of a suitable motor which actuates the fan and sprocket mechanism 35, and this in turn rotates the shaft 34. Because the shaft 34 is connected to the disc 33 that is affixed to the adjacent plate 19, it will be seen that this actuating of the chain and sprocket mechanism 35 will cause corresponding rotation of the drum 15 and outer housing 28.

The parts can be made of any suitable material and in different shapes and sizes.

The drum 15 may be made of expanded metal. If desired, the heat source or fire may be arranged in the back portion of the rotisserie. Also, any suitable heating source such as gas, hickory wood and limbs can be used, and provision may be made for causing the smoke and waste heat to exhaust through a suitable location such as through a chimney. Various types of food products such as meats, grits, chicken and the like may be barbecued or cooked. The drum or cylinder is adapted to be turned a relatively slow speed to accomplish the cooking in the proper manner. Natural gas can be used as the heat source, or else charcoal, electricity or the like can be used to provide heat. The barbs or prongs 29 are adapted to hold smaller pieces of meat thereon. A conventional motor and gear box can be used for rotating the drum such as a speed of one revolution per minute. The spit consists of one long sharpened rod with six prongs in order to hold the meat or other articles on the spit. The rotisserie is in the shape of a drum or barrel, and the entire rotisserie may be made of stainless steel. The device is provided with a plurality of door sections or support sections 22 that can be opened as previously described in order to hold the meat on the outside of the drum 15. By means of the door 31 a person can readily gain access to the interior of the drum to service the food products on the spit. In addition, more than one spit can be provided in the drum as desired or required. The heat of the rotisserie may be accomplished by either using natural gas, electricity, charcoal, wood or by a combination of these heating sources. The rotisserie has a large capacity so that the present invention can be used in commercial establishments or else it can be used for domestic purposes.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

I claim:

1. A rotisserie comprising frame members, a horizontally disposed tray supported between said frame members, heating means for said rotisserie, a hollow rotisserie drum including a main body portion of meshlike apertured material, parallel bands affixed to the ends of said drum, vertically disposed spaced parallel circular plates contiguous to said bands and secured thereto, spaced apart lugs on said plates, a plurality of support sections each including a plurality of spaced parallel rods, arcuate straps affixed to end portions of said rods, and portions of said straps being hingedly connected to said lugs, retainers for selectively maintaining said support sections in closed position, pointed prongs affixed to the rods of at least one of said support sections, said support sections when in closed operative position defining a cylindrical housing that is slightly larger in diameter than the drum whereby there is provided between the housing and drum a space for receiving and holding foodstuffs to be cooked, a door hingedly connected to the intermediate portion of said drum, and means for rotating said drum and housing.

2. The structure as defined in claim 1, wherein said last named means comprises vertically disposed discs affixed to the outer surface of said plates, shafts connected to said discs and said shafts being supported by said frame member, and a chain and sprocket mechanism connected to at least one of said shafts.

3. The structure as defined in claim 1, and further including a spit mounted in said drum, and said spit including a crosspiece having apertured elements on the outer ends thereof, and a plurality of pointed elements on said spit for engaging food products to be barbecued or cooked.